No. 871,093.
PATENTED NOV. 12, 1907.
L. C. EISENHUT.
WEIR AND TIDE GAGE.
APPLICATION FILED OCT. 13, 1904.
3 SHEETS—SHEET 3.
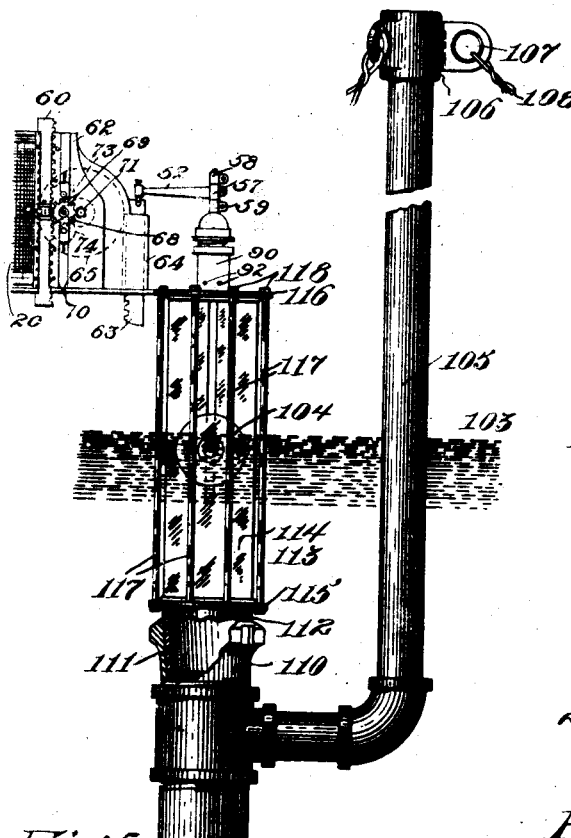
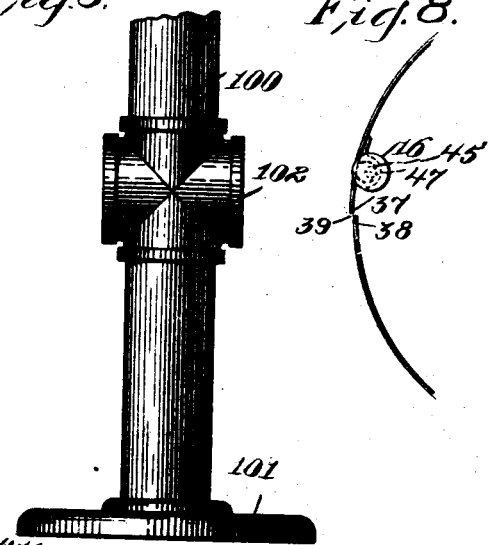
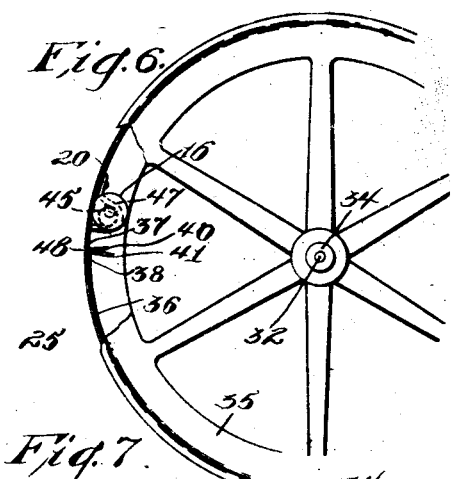
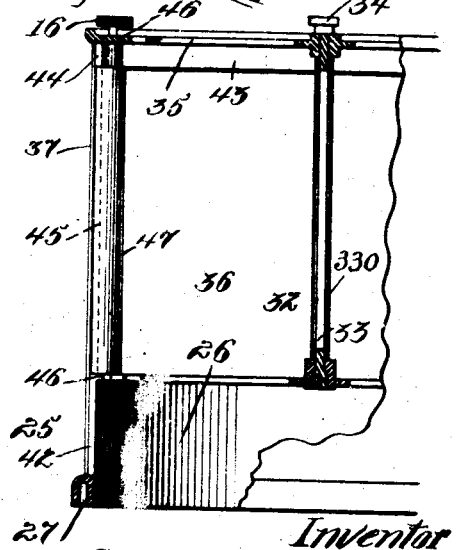
Witnesses:
G. C. Fuss.
John H. Lynch.
Inventor
Laurense C. Eisenhut.
By his attorney,
J. W. Richards under_ # UNITED STATES PATENT OFFICE.

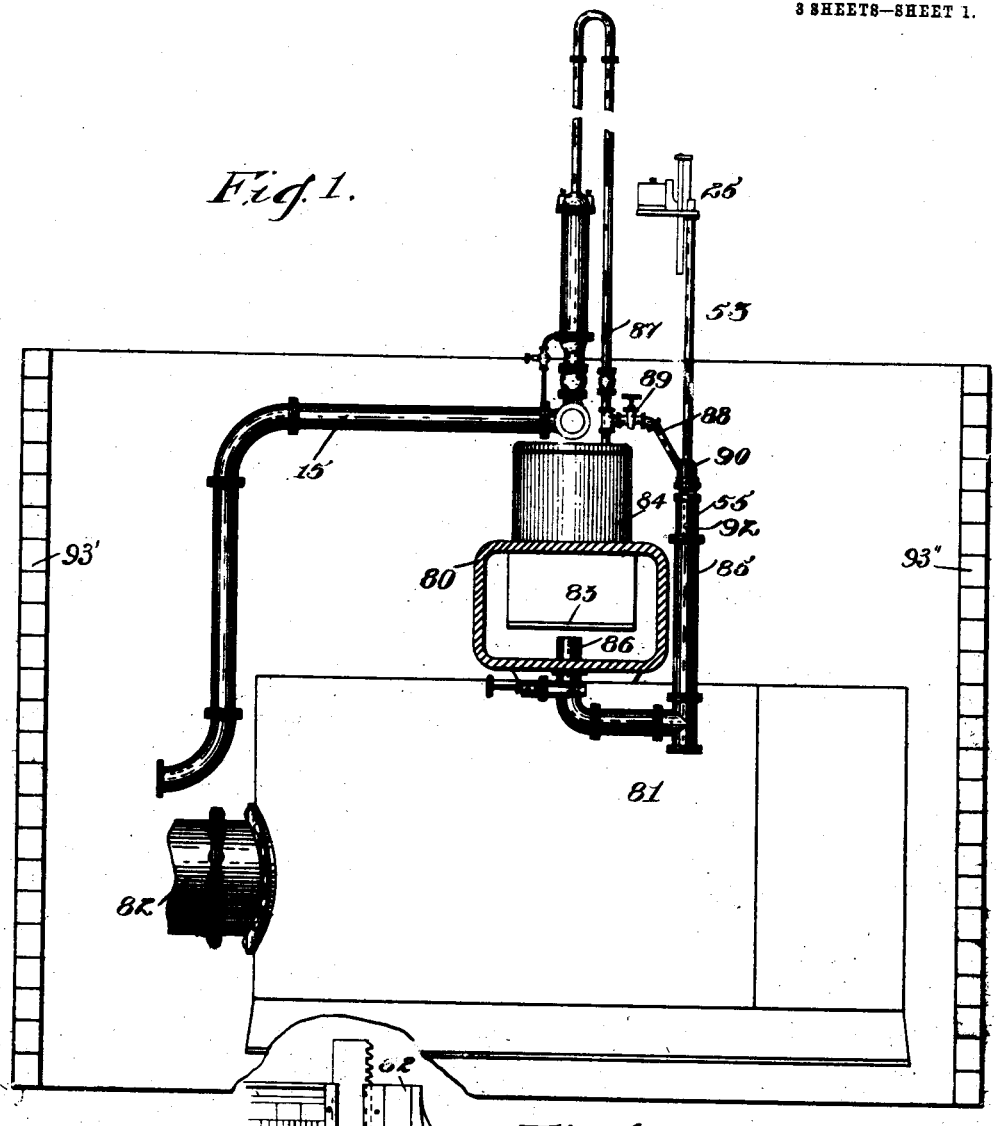

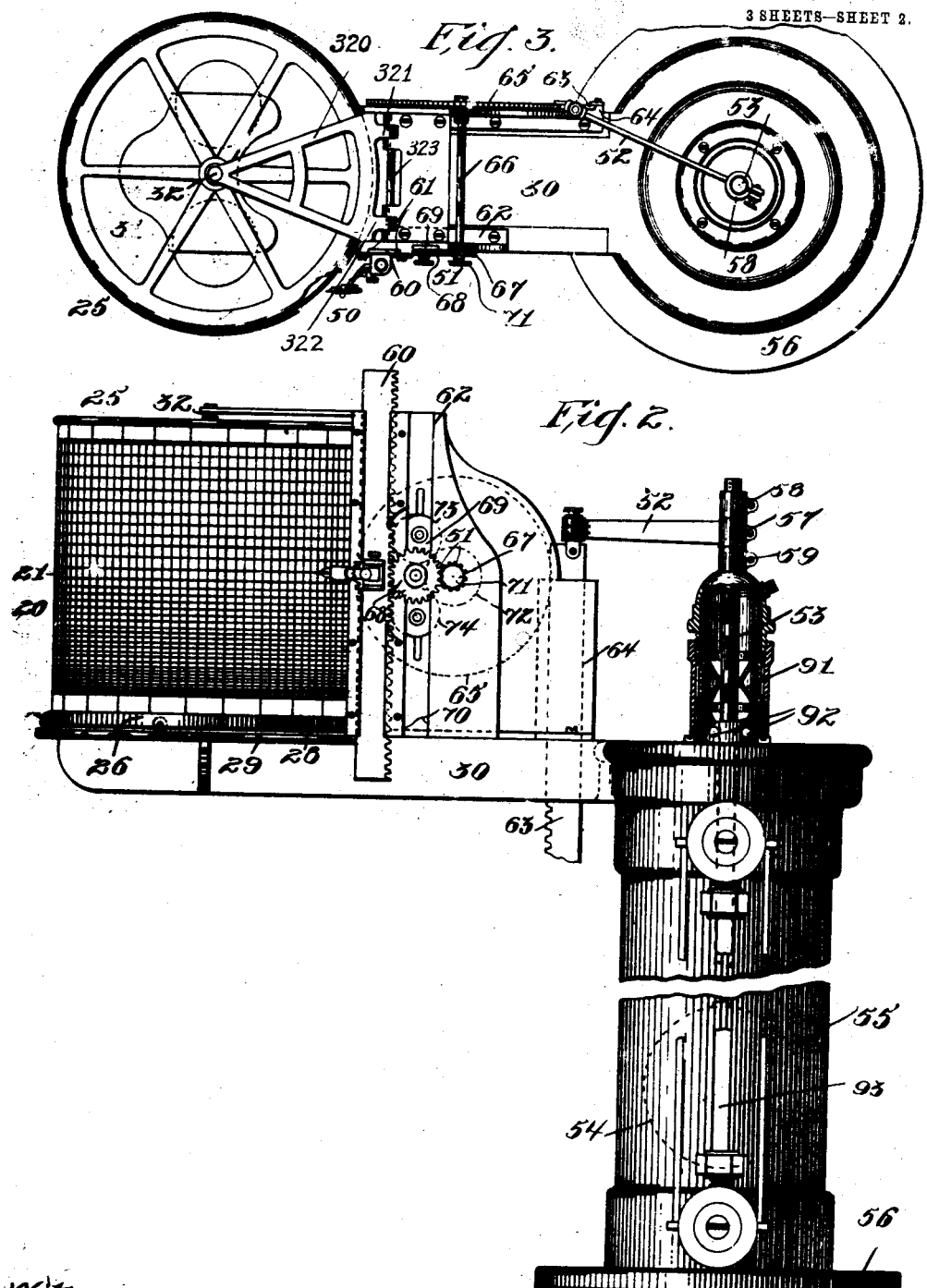

LAURENSE C. EISENHUT, OF NEW YORK, N. Y., ASSIGNOR OF ONE-HALF TO GILBERT ELLIOTT, OF BROOKLYN, NEW YORK.

WEIR AND TIDE GAGE.

No. 871,093.   Specification of Letters Patent.   Patented Nov. 12, 1907.

Application filed October 13, 1904. Serial No. 228,277.

*To all whom it may concern:*

Be it known that I, LAURENSE C. EISENHUT, a citizen of the United States, residing in borough of Kings, Brooklyn, New York city, in the county of Kings and State of New York, have invented certain new and useful Improvements in Weir and Tide Gages, of which the following is a specification.

This invention relates to and has for its object to provide an improved water gage and one which is adapted to the measurement of water passing over a weir sill or through a conduit or to record the variations in height of a standing body of water.

In the drawings accompanying and forming a part of this specification, Figure 1 represents a side view of a weir sill and receiver in connection with a conduit having my improved recording gage applied thereto. In this form of the device the water passing through the conduit is assumed to be under suction, and a certain degree of vacuum maintained therein. Fig. 2 is a side view of the recording gage drum and the float tube of the device illustrated in Fig. 1. Fig. 3 is a top plan view of Fig. 2. Fig. 4 is a broken away portion of the device illustrated in Fig. 2 with a different sized pinion in the train of gear. Fig. 5 is a side view, partly broken away, of a form of applying the invention, which is peculiarly adapted for use in measuring the height of open bodies of water, although it may be used in other connections. Fig. 6 is a partial top plan view, broken away, of a chart drum. Fig. 7 is a side elevation thereof, also broken away, and Fig. 8 is a detail illustrating the drum shell shown in Fig. 6 in a different position, namely, with the parts separated to permit the ready insertion of the chart paper.

When the invention is applied to measuring water passing through conduits, such conduits will have a portion which may be regarded as a weir sill, and the present improvement is so constituted that it will register the most minute and rapidly changing heights or depths of a stream flowing over such weir sill portion, which registration may be upon a removable chart, which may be preserved for record. Such chart may be made of paper, and as illustrated in the drawings herein, and designated in a general way by 20, may have upon it suitable lines 21 to correspond to any system of measurement which may be desired to be employed, as for instance gallons or cubic feet. In Fig. 2 the chart lines 21 are shown as arranged in different series, merely showing the flexibility of the device.

The drum for carrying the chart is designated in a general way by 25 and comprises a base portion 26 having a groove 27 in which are mounted a number of antifriction rollers 28 adapted to run upon a track portion 29 of a bracket 30, which bracket 30 constitutes in the present instance the bed-plate of the recording mechanism.

The base portion 26 constitutes a housing having suitable clock mechanism, designated in a general way by
31, which will be connected to the shaft 32 of the drum
and which shaft is shown as comprising telescopic portions 33, 330, secured in place by means of a suitable
screw 34 which will hold the top portion of the drum,
illustrated in the present instance as a wheel 35, in
place upon a drum shell 36, which shell may be of some
material adapted to maintain its conformation, and
which may in practice be sheet steel. The drum shaft
may be supported by a member 320 hinged at 321, 322 to a pin 323 carried by the frame 62. The shell will be
fastened to the top and bottom members of the drum
and constitute a surface over which the chart paper
may be smoothly drawn, presenting a plane cylindrical
surface for a recording tool, designated in a general way
by 50, to pass over and make its record. The drum
shell may be split having its abutting ends 37, 38 in a
line parallel with the axis of the drum and constituting
an opening 39, through which the ends 40, 41 of the
chart paper 20 may be passed. The body member 26 may also have a slit or opening 42 registering with such
opening 39, and the flange 43 of the top member may
also have a kerf or opening 44 similarly registering with
such opening 39.

After the ends of the paper chart are passed through the opening 39, the resiliency of the drum will ordinarily be sufficient to hold the drum edges and the
chart paper ends in place. One of the drum edges,
as 37, may, however, be provided with means for
springing it outwardly to permit the more ready insertion of the said ends of the paper chart, and when
the parts are returned to their normal position, to
hold the edges together and increase their bite. Such
edge may be sprung out by means of an eccentric 45
having bearings 46, 46 in the top and bottom members
of the drum and be provided with a knurled head 16
or some other suitable means for actuating it. The
shell of the drum may carry a bearing portion 47 surrounding the eccentric, so that the eccentric may
also draw the end which is adapted to be sprung back
into its normal position and there lock the same. The
parts in such position are shown in Fig. 6, Fig. 8 showing the open or sprung position.

In measuring or recording fluctuations of considerable range, for economy of space it is desirable to reduce the space occupied by the record upon the chart,
and assuming a float is employed for rising and falling
with the rise and fall of the surface of the water, some
reducing mechanism may be inserted between the
recording tool 50 and such float, and which, in the
present instance, in the form illustrated in Fig. 2,
comprises a train of gears, designated in a general way
by 51, actuated by an arm 52 fast upon the stem 53 of a float 54, shown in dotted lines, which float is carried by the water within the float tube 55, which tube is illustrated as having a flange 56 adapted for securement to a stand-pipe or other connection with the water container where the measurement is to be made. The connection between the arm 52 and the float rod 53 may be by means of an adjustable split collar 57, and similar collars 58, 59 may be carried by the stem at each side of such arm collar 57, and in some instances the collars 58, 59 may be fast upon the float rod and the collar 57 may be loose thereon, so that any tendency of the float to rotate within the tube 55 will not produce torsion upon the rod 53, which torsion would be accompanied with increased friction in the bearings.

The recording tool is shown as carried by the rack bar 60 shiftable in ways 61 of the frame work 62 carried by the bed-plate 30, which ways, in the present instance, are illustrated as vertically disposed. The train of gearing between the rack bar 60 and the rack bar 63 carried by the arm 52 and reciprocable in ways 64 of the frame, comprises a gear wheel 65 fast upon a shaft 66 having bearings in the frame, a pinion 67 being fast upon such shaft 66 and meshing with a wheel 68 carried by a slide 69, shiftable in ways 70 of the frame, and which latter pinion is in mesh with the rack bar 60. For the purpose of changing the gearing the pinion 67 may be removably held upon the shaft 66 by means of a set screw 71, and when it is desired to change the gearing, as for instance, by substituting a gear having an equal pitch line with the gear wheel 68, the pinion 67 may be removed and a pinion, illustrated by 72, see Fig. 4, may be substituted, and in which instance the slide 69 will be moved upon the ways 70 until the pinion 68 assumes a position permitting it to mesh with the pinion 72. Different sizes of pinions may be employed to produce charts of different scales. For instance, if the apparatus is being used where the fluctuations are of comparatively narrow range the gearing down need not be so great as where the fluctuations are greater. By this reducing gear charts of uniform size may be employed irrespective of the difference in fluctuation.

In some instances the main 80, as illustrated in Fig. 1, will be traversed by a stream of water under suction influence which may be a certain amount of vacuum, and which water may pass into the receiver 81 and have its exhaust through a pipe 82 running to some pumping device adapted to produce the desired conditions within the conduit. This conduit is shown as having a weir sill 83. The float cylinder 55 is shown as mounted upon piping 85 having an end 86 communicating with the conduit adjacent to and slightly below the level of the weir sill. A line of pipe 15 also runs to the air pump or exhaust, and a line of pipe 87 may also run from said line pipe 15 and the reservoir 84, by means of a pipe 88 having a valve 89, to the dome 90 of the float pipe 55, and which dome, in the present instance, is shown as having within it one or more flexible stuffing box members 91 adapted when pressed inwardly by the atmospheric air entering through openings 92 to embrace the rod 53 and exclude the atmospheric air from entering the top of the float pipe 55, which must be the same degree of vacuum as is maintained in the conduit 80. The vacuum of course will be produced through the pipe 88 and the stuffing box 91, such acting not only as a stuffing box but as a valve, a trap and guide.

The float tube may be provided with a suitable sight gage 93, which may be of any suitable construction, and will be found useful in the initial setting of the device to enable the operator to ascertain the relative position of the float to the maximum and minimum lines of fluctuation so that he can adjust the recording tool accordingly, and to assist in setting the device scales as 93', 93'' may be employed, see Fig. 1.

The advantage of fastening the paper chart upon the drum in the manner hereinabove described, permits the chart to have uniform margins, which could not be the case were the drum chart pasted upon the drum and then cut off, assuming the instrument to run from edge to edge of the drum, or in some instances to overlap the edges. By means of this device a clean or substantially flush edge 48 is had at the meeting of the two ends 40, 41. so that the entire circumference of the drum shell is available for the purpose of recording and sufficient paper will be left for marginal remarks.

In recording the fluctuations of a body of water, as for instance in ascertaining the leakage or evaporation from a reservoir, a stand pipe 100, see Fig. 5, may be mounted by means of a suitable flange 101 upon some foundation, and a four-way coupling 102 may be a convenient means of admitting the water into the stand-pipe and may be put sufficient distance below the surface, designated in a general way by 103, of the water so that wind and wave motion will not be transmitted to the float 104 which is to carry the fluctuations to the recording apparatus. The stand pipe may be provided with an arm 105 which for convenience may be made of piping and have a head 106 provided with eyes 107 for guy ropes 108 to steady the device. In this form of gaging the gage will in many instances be employed for a short period of time only, for instance, only ten to thirty minutes. The stand-pipe and its connections will remain in the body of water in some instances permanently, but the recording apparatus will be placed in position and used as occasion may demand. To this end the stand-pipe may have fastened into it in some convenient manner, as by screwing, a seat member 110 having an internal face 111, in the present instance conoidal, to receive a plug 112, also having a conoidal face, to register with that of the face 111, which plug 112 is shown as hollow and connecting with the float tube 113. This affords a convenient means for attaching the float tube and the recording gage, and as the connection will have to be made under water, it is a simple and efficient means of connection.

In the present instance the float tube comprises a glass cylinder 114 held upon heads 115, 116 by rods 117 having nuts 118 to bind the heads together and hold them fast upon the glass tube 114. The head 116 may also constitute the bed-plate of the recording instrument. Reducing or increasing gearing may be employed between the float and the recording tool as occasion may demand. If for measuring leakages in large reservoirs, which leakages will only amount to a small fall of the surface of the water, then it may be expedient to gear up the connection, and if the fluctuation is great it may be desirable to gear it down.

Although the chart drum is illustrated as near to the path of movement of the float rod yet it will be apparent that the distance may be increased as occasion may demand.

Having thus described my invention, I claim:

1. A chart-drum having resilient walls, said walls having closely abutting edges at one side of the drum, an eccentric for springing one of the edges out of its normal or abutted position, and a sheet metal bearing upon the inside of the said edge and surrounding said eccentric whereby the same may return the said edge to its normal position.

2. In a weir gage the combination with a float, of a movable chart drum, a frame work provided with horizontal bearings and vertical grooves, a shaft mounted in said bearings, a rack bar carried by said float and shiftable in one of said grooves, a gear wheel fast on said shaft and in mesh with said rack bar, a tool to record upon said chart, a rack bar carrying said tool and shiftable in one of said grooves, a plate movable in another of said grooves, a gear wheel carried by said plate and in mesh with the tool carrying rack bar, and an interchangeable pinion carried by said shaft and in mesh with the gear wheel on said plate.

3. In a water gage the combination with a float actuated recording device, of a float tube carried thereby and having a conoidal end, a float in said tube and connected to said recording device, and a stand pipe having a conoidal seat adapted to receive the said end of the float tube.

4. In a water gage the combination with a stand pipe having a conoidal seat at its end, of a recording device, a float and a float tube carrying the same, and a conoidal plug upon said float tube adapted to fit said seat.

5. In a water gage, the combination of a connection for a stand pipe and a recording instrument embodying a tube effective when in communication with said stand pipe and comprising a conical seat on one of them, and a conical plug on the other of them.

6. In a stream flow gage the combination with a stand pipe open to the stream, of a float therein, a rotary drum adjacent to the stand pipe and adapted to carry a chart sheet, means to rotate the drum, a scribing instrument, a vertically reciprocatable slide for carrying the same and provided with a rack bar, a rack bar reciprocatable by the float, and a train of gear between the said rack bars, a reciprocatory plate carrying one of said gears and one of them being interchangeable whereby the movable gear may be placed in mesh with interchangeable gears of various radii.

7. In a water gage the combination with a water actuated float, of means to carry a chart sheet, a scribing instrument, a reciprocating slide for carrying the same and provided with a rack bar, a rack bar reciprocatable by the said float, a train of gear between said rack bars, and a plate reciprocatable on a line parallel to the line of reciprocation of said slide and carrying one of said gears, and another of them being interchangeable, and means for removably securing said interchangeable gear to said plate.

8. In a water gage the combination with a float, of means for carrying a chart, a scribing instrument, a reciprocatable rack bar connected to said instrument, a rack bar reciprocatable by the said float, a train of gear between said rack bars, one gear of said train being interchangeable, and a slide carrying one of them.

9. In a water gage the combination with means to carry a chart sheet, of a recording tool, a rack bar for actuating said tool, a float, a train of gear actuated by said float, and a reciprocatory plate carrying one gear of said train.

10. In a water gage the combination with means to carry a chart sheet, of a recording tool, a rack bar for actuating said tool, a float, a train of gear actuated by said float, a reciprocatory plate carrying one gear of said train, and another gear of said train being interchangeable.

11. The combination with a recording tool and a train of gear for actuating the same, of a rack bar reciprocatable in ways and in mesh with a gear of said train, a float, a float tube, a float rod connected to said float and extending out of said tube, a guide for the float at the top of the tube, an arm fast to said rack bar and connected to said float rod for moving therewith in its longitudinal movement but swiveled for permitting independent angular movement of the said rod on its axis.

Signed at Nos. 9 to 15 Murray street, New York, N. Y., this 11th day of October, 1904.

LAURENSE C. EISENHUT.

Witnesses:
 CHAS. LYON RUSSELL,
 FRED. J. DOLE.